United States Patent
Madzgalla et al.

(10) Patent No.: US 6,357,559 B1
(45) Date of Patent: Mar. 19, 2002

(54) DISK BRAKE AND BRAKE LINING FOR SAME

(75) Inventors: Frank Madzgalla, Koblenz; Hubert Krautkremer, Mülheim-Kärlich; Christian Schroeter, Sinzig; Guido Zenzen, Macken, all of (DE)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/611,244

(22) Filed: Jul. 6, 2000

(30) Foreign Application Priority Data

Jul. 6, 1999 (DE) .......................... 199 31 024

(51) Int. Cl.$^7$ ............................... F16D 55/00
(52) U.S. Cl. .................................. 188/73.32
(58) Field of Search ............... 188/73.32, 73.1, 188/73.47, 71.1, 242, 245, 244, 247, 248, 250 B, 255, 258

(56) References Cited

U.S. PATENT DOCUMENTS

| | | | |
|---|---|---|---|
| 3,042,152 A | * | 7/1962 | Butler |
| 3,486,589 A | * | 12/1969 | Hillegass |
| 4,606,438 A | | 8/1986 | Mathais |
| 5,103,939 A | | 4/1992 | Schroeter |
| 5,343,985 A | | 9/1994 | Thiel et al. |

FOREIGN PATENT DOCUMENTS

| | | |
|---|---|---|
| DE | 3346479 | 6/1984 |
| DE | 3708699 | 9/1988 |
| DE | 4208003 | 10/1992 |
| DE | 4126339 | 2/1993 |
| EP | 412541 B1 | 2/1991 |
| EP | 480366 | 4/1992 |

* cited by examiner

Primary Examiner—Christopher P. Schwartz
Assistant Examiner—C. T. Bartz
(74) Attorney, Agent, or Firm—MacMillan, Sobanski & Todd, LLC

(57) ABSTRACT

Disk brake comprising a brake anchor plate (10) which is fastenable to a vehicle, a floating frame (12) which engages over a brake disk (14) of the brake and is guided on the brake anchor plate (10), at least one first brake shoe (22) which in the installed state of the brake is supported against the floating frame (12) at the side of the brake disk (14) directed towards the outside of the vehicle, at least one second brake shoe (20) which in the installed state of the brake is supported counter to braking forces against the brake anchor plate (10) at the side of the brake disk (14) directed towards the inside of the vehicle, at least one operating piston (24) which is disposed on the floating frame (12), wherein the brake shoes (20, 22) are removable substantially radially in relation to the axis of the brake, and wherein the first brake shoe (22) at its rear side (66) has a detent device (68) and the floating frame (12) has a detent device (72) complementary thereto, and that the brake shoe (22) is fastened to the floating frame (12) through latching of the detent device (68) with the detent device (72) complementary thereto. The invention further relates to a brake shoe which is suitable for the previously described disk brake.

18 Claims, 4 Drawing Sheets

DISK BRAKE AND BRAKE LINING FOR SAME

BACKGROUND OF THE INVENTION

The invention relates to a disk brake comprising a brake anchor plate which is fastenable to a vehicle, a floating frame which engages over a brake disk of the brake and is guided on the brake anchor plate, at least one brake shoe which in the installed state of the brake is supported against the floating frame at the side of the brake disk directed towards the outside of the vehicle, at least one further brake shoe which in the installed state of the brake is supported counter to braking forces against the brake anchor plate at the side of the brake disk directed towards the inside of the vehicle, and at least one operating piston which is disposed on the floating frame. The invention also relates to a brake lining for such a disk brake.

A disk brake of the type described initially is known from EP 0 412 541 B1 and EP 0 480 366 A1. In both cases, the disk brake is notable for the fact that two separate brake shoes are disposed on either side of the brake disk, and that at least one pair of operating pistons are provided, which are disposed on the floating frame symmetrically in relation to an axial centre plane of the brake anchor plate. The invention relates in particular to an improvement of said known sectional-lining disk brake in view of simple and reliable assembly of the brake shoes. The invention is however quite generally applicable to disk brakes of the type described initially.

Fastening to the floating frame of the brake shoes, which in the installed state of the brake are disposed at the side of the brake disk directed towards the outside of the vehicle, is problematical with sectional-lining disk brakes according to prior art. Particularly during hard braking operations, the fastenings of the brake shoes are subject to considerable loads. This may lead to loosening of the brake shoes. In the disk brake described in EP 0 480 366 A1, for example, the brake linings disposed in the installed state of the brake at the side of the brake disk directed towards the outside of the vehicle are supported against pins, which are pressed into bores of the floating frame. When the vehicle brake over an extended period is operated in the so-called 1 g range, i.e. operated so hard that the vehicle is braked at a deceleration of 1 g, the acceleration due to gravity of around 10 m/s$^2$, said pins may work loose. As a result, the stability of the arrangement of the brake shoes is seriously impaired.

From DE 33 46 479 A1 a disk brake having a brake anchor plate, a floating frame, a plurality of brake shoes and an operating piston is known. A brake shoe disposed at the side directed towards the outside of the vehicle is provided at its side remote from a brake disk with projections in the form of ribs. The floating frame of the disk brake has complementary recesses in the form of grooves.

SUMMARY OF THE INVENTION

The object of the invention is therefore to provide a more secure and reliable design for the support and/or fastening of the brake shoes, which in the installed state of the brake are disposed at the side of the brake disk directed towards the outside of the veheicle. A further object of the invention is to enable simple and operationally reliable installation of the brake shoe.

Said object is achieved according to the invention by a disk brake according to claim 1 or claim 2.

The brake shoes described in claims 10 and 11 correspond to said solution according to the invention.

Preferred refinement of the invention are described in the dependent claims.

Thus, the dimensions of the brake are preferentially such that the installation of a new (replacement) brake shoe is possible only when the said projection engages into the recess or groove.

A preferred refinement of the invention provides that the two recesses are arranged in a stepped manner such that the projection during installation latches into the further recess so that the fitter may be certain that the brake shoe is situated in the correct position. In said case, the further recess preferentially takes the form of a bore. In the installed position of the brake shoe the projection engages into the bore, and indeed preferably with a precise fit so that, firstly, from the engagement of the projection into the additional recess the fitter may tell that the brake shoe is seated securely and in the correct position and, secondly, by virtue of application of the projection against the walls of the further recess the brake shoe is secured in addition to the optionally further provided support.

It is advantageous when the recess, which preferentially takes the form of a groove, in installation direction and/or the direction, in which the projection is guidable into the groove, terminates after the recess at a stop. By said means, the fitter installing the brake shoes notices at which point of the groove the further recess is situated and therefore at which moment during introduction of the brake shoe a suitable pressure of the brake shoe onto the floating frame has to be exerted in order for the projection to latch in the recess.

It is likewise advantageous when the height of the projection and the distance between the floating frame and the brake disk are such that the distance between the surface of the first brake shoe, which is directed towards the brake disk, and the brake disk during guidance of the projection in and along the groove or of the groove over the projection is smaller than the depth of the groove. It is therefore namely impossible for the brake shoe to be introduced into the space between the floating frame and the brake disk without the projection sliding along in the groove, because there is no room to guide the projection along next to the groove on the surface of the floating frame. In the first alternative, the projection is preferentially positioned in the brake shoe as far away as possible from the region of the first brake shoe which is grasped during installation of the brake shoe. This may mean, for example, that the projection is situated in the vicinity of the bottom edge of the brake shoe because the brake shoe is grasped in the region of the top edge during installation. For the sake of simplicity, the expressions "top" and "bottom" here are taken to mean that the brake is installed with a vertically extending centre plane. In said case, the expressions "top" and "bottom" relate to the vertical. To the person skilled in the art it is self-evident that brakes may also be installed in other ways, namely not so that their centre plane extends vertically. It goes without saying that the expressions "top" and "bottom" for such cases are to be taken to have an analogous meaning in the sense that "top" means "radially outer" and "bottom" means "radially inner".

The previously described arrangement of the projection in the vicinity of the bottom edge of the brake shoe, on the one hand, has the advantage that the groove may as a result be of a particularly long design so that the brake shoe is guided in the groove virtually throughout the process of introduction into the brake. On the other hand, said feature is advantageous when the brake shoes are glued to the floating frame so as to form with the latter a coupling mass in relation to vibrations. In said case, the brake shoe is generally already provided at its side to be affixed, i.e. at the rear side, with an adhesive layer which is covered by a protective foil for transportation purposes. Immediately prior to installation of the brake shoes, the protective foil is removed to expose the adhesive layer. During introduction of the brake shoes, contact between the adhesive layer and the frame is to be avoided as far as possible up to attainment of the end position. Maximizing the distance between the projection and the point at which the brake shoe is grasped guarantees minimum canting of the brake shoe and stable guidance in the groove, so that there is less likelihood of contact between the adhesive rear side of the brake shoe and the floating frame.

BRIEF DESCRIPTION OF THE DRAWINGS

There now follows a detailed description of an embodiment of the invention with reference to diagrammatic drawings. The drawings show:

in FIG. 1 on the left;

DETAILED DESCRIPTION OF THE PREFERRED EMBODIMENT

Figure 1:
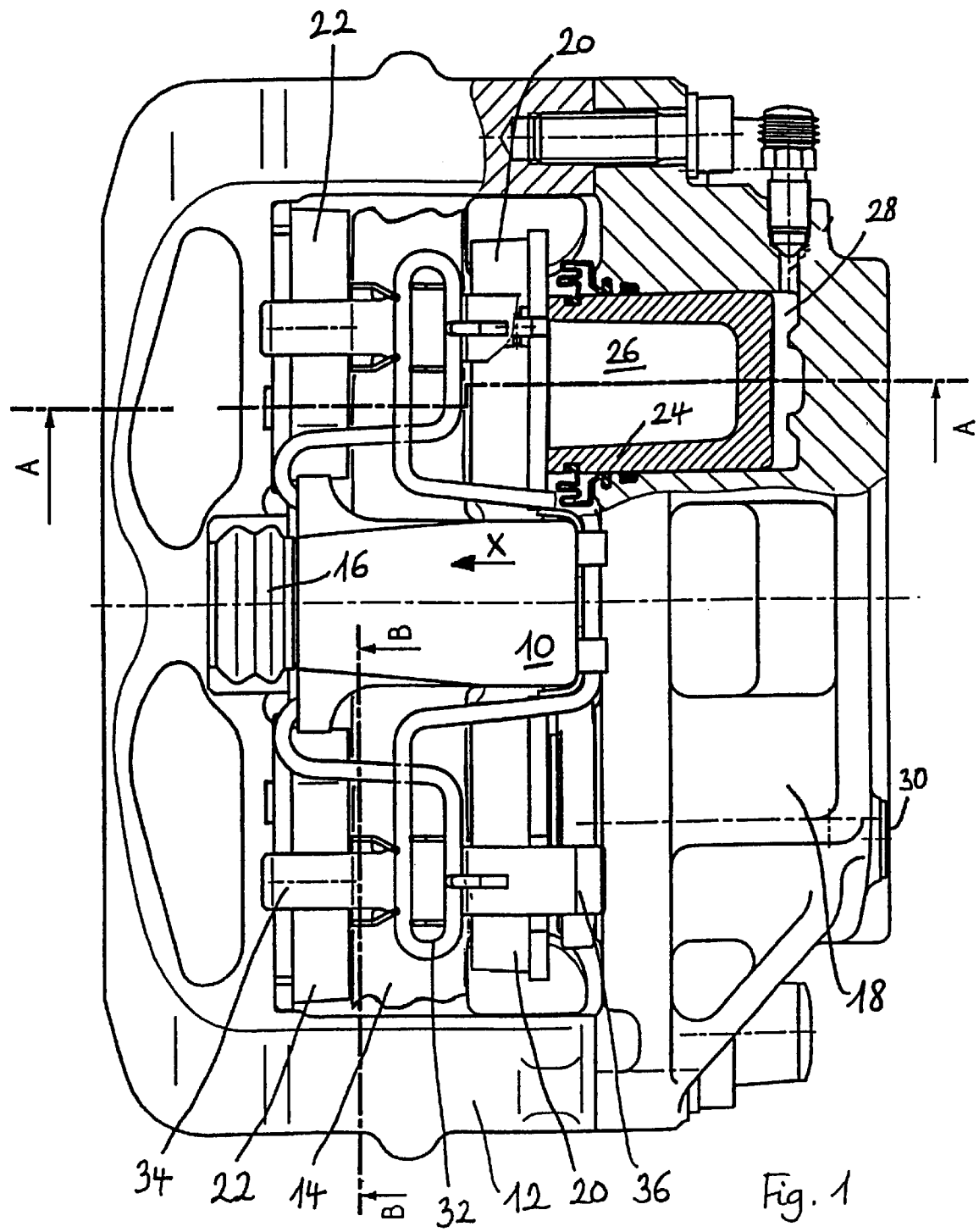
FIG. 1 a plan view of the disk brake with the brake shoes according to the invention.

The disk brake illustrated in the drawings is based on the disk brake described in EP 0 412 541 B1 and EP 0 480 366 A1, and its mode of operation is described in detail in said specifications.

As FIG. 1 reveals, the supporting structure of the disk brake is formed by a brake anchor plate 10, which is fastened to a vehicle, and by a floating frame 12 which engages over a brake disk 14 of the brake. The floating frame is guided by means of a sealed guide pin 16 on the brake anchor plate 10 and connected to the housing 18.

Guided in the brake anchor plate 10 are two ("inner") brake shoes 20, which in the installed state of the brake are disposed at the side of the brake disk 14 directed towards the inside of the vehicle. Accommodated in the floating frame 12 are two ("outer") brake shoes 22, which in the installed state of the brake are disposed at the side of the brake disk 14 directed towards the outside of the vehicle.

Operation of the brake is effected by means of two pistons 24 (of which only one is shown in detail at the top of FIG. 1), which in order to save material and weight have a cavity 26 and in a known manner are guided in a cylinder. In a pressure chamber 28 via an inlet 30 a brake pressure is generated by means of a hydraulic fluid and moves the two pistons to the left in FIG. 1. The brake shoes 20 are therefore applied against the brake disk 14. Owing to the principle of "action=reaction", in accordance with the motion of the piston 24 to the left the housing 18 and the entire floating frame 12 moves in FIG. 1 to the right, with the result that the brake shoes 22 are brought into contact with the outer side of the brake disk 10.

To prevent clattering, rattling or squeaking of the inner and outer brake shoes 20 and 22 in the idle position and during braking, a holding-down spring 32 comprising a plurality of parts is provided, which by means of spring arms 34 and 36 presses the brake shoes 20 and 22 against their assigned guides and/or supports described further below. In a generally known manner the spring arms 34 and 36 additionally press the brake shoes 20 and 22 away from the brake disk 14 in order, after release of the brake, to restore the brake release clearance between the brake shoes and the brake disk.

Figure 2:
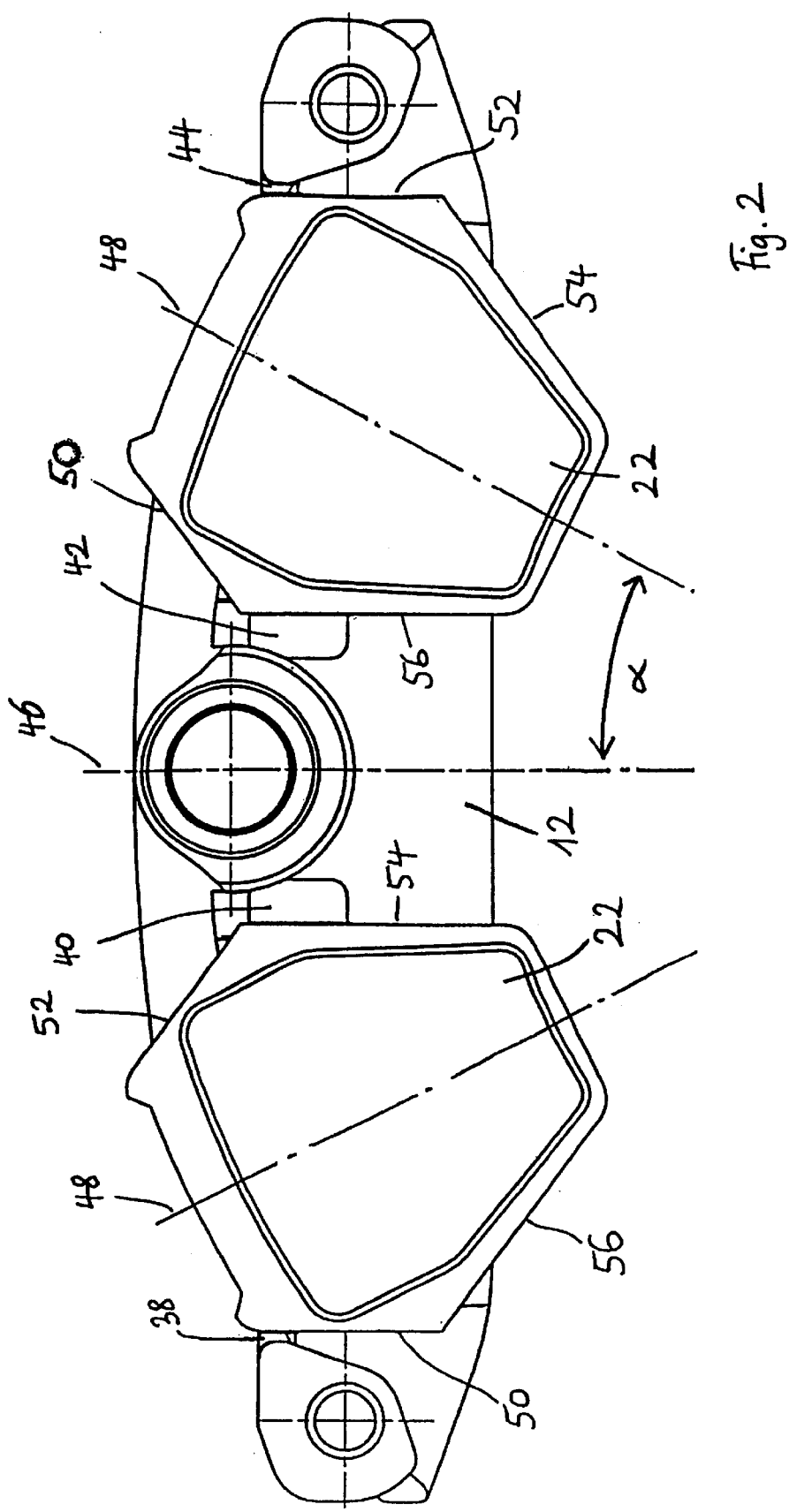
FIG. 2 a view of the floating frame with the brake shoes disposed at the side of the brake disk directed towards the outside of the vehicle, i.e.

FIG. 2 shows the floating frame 12 with the two brake shoes 22 such as they might look, say, given an extension of the section B—B in FIG. 1 in the direction of the arrow X, wherein the brake disk 14 and the spring arms 34 are not shown.

As FIG. 2 reveals, on the floating frame 12 four supports 38, 40, 42 and 44 are provided, into which peripheral forces are introduced by the outer brake shoes 22. The four supports 38, 40, 42 and 44 extend parallel to one another and parallel to the floating frame centre plane 46, which is perpendicular to the drawing plane. The radially extending centre lines 48 of the brake shoes 22 together with the centre plane 46 form an angle a.

Although the brake shoes 22 as such are symmetrical, by virtue of the tilting of their centre line 48 towards the centre plane 46 of the floating frame the edges of the brake shoes, which are applied against the supports 38, 40 42 and 44, are not in each case opposite edges in peripheral direction of the brake disk. The edge 50 of the left brake shoe 22 is applied against the support 38 and the edge 54 against the support 40, depending on the direction of travel. The edge 56 of the right brake shoe 22 is applied against the support 42 and the edge 52 against the support 44. Depending on the direction of rotation of the brake disk 14, either the peripheral forces of the brake shoes are introduced via the edge 50 into the support 38 and via the edge 56 into the support 42 or the peripheral forces of the brake shoes are introduced via the edge 54 into the support 40 and via the edge 52 into the support 44.

As the supports 38, 40, 42 and 44 extend parallel to the centre plane 46 of the floating frame, the brake shoes are inserted from top to bottom in FIG. 2 parallel to the centre plane 46.

Figure 3:
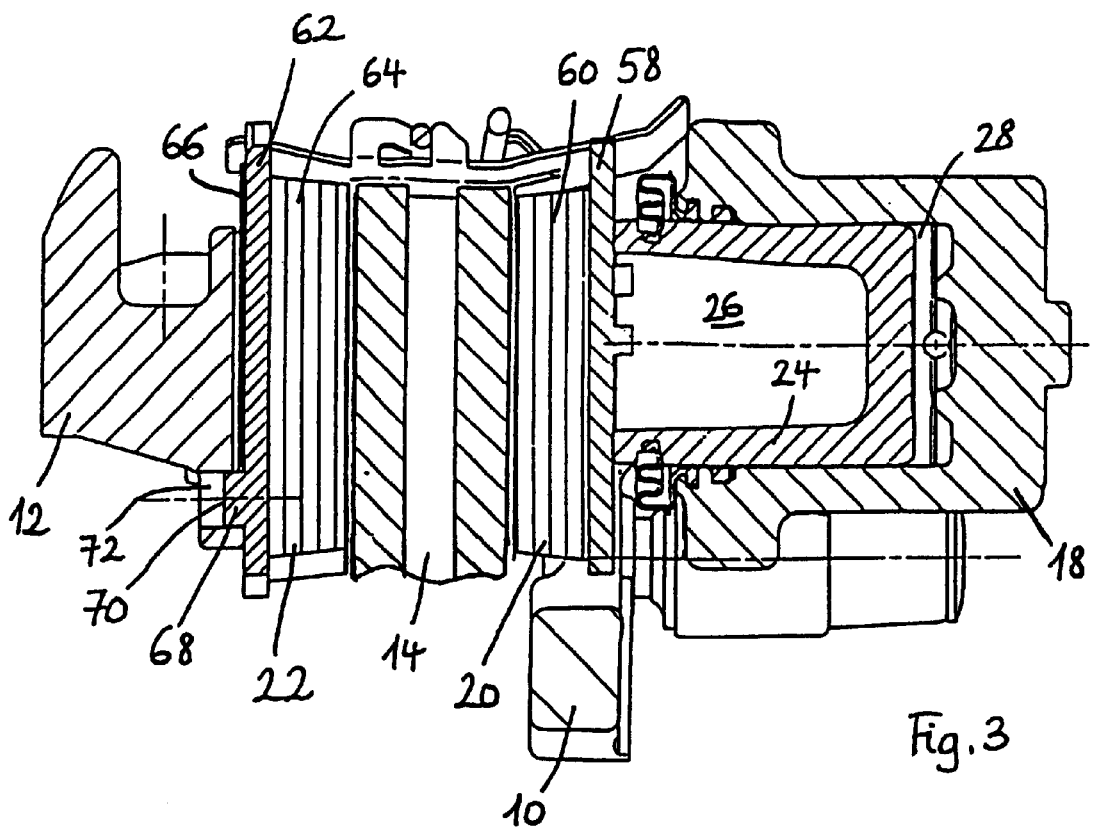
FIG. 3 the section A—A of FIG. 1.
Figure 4:
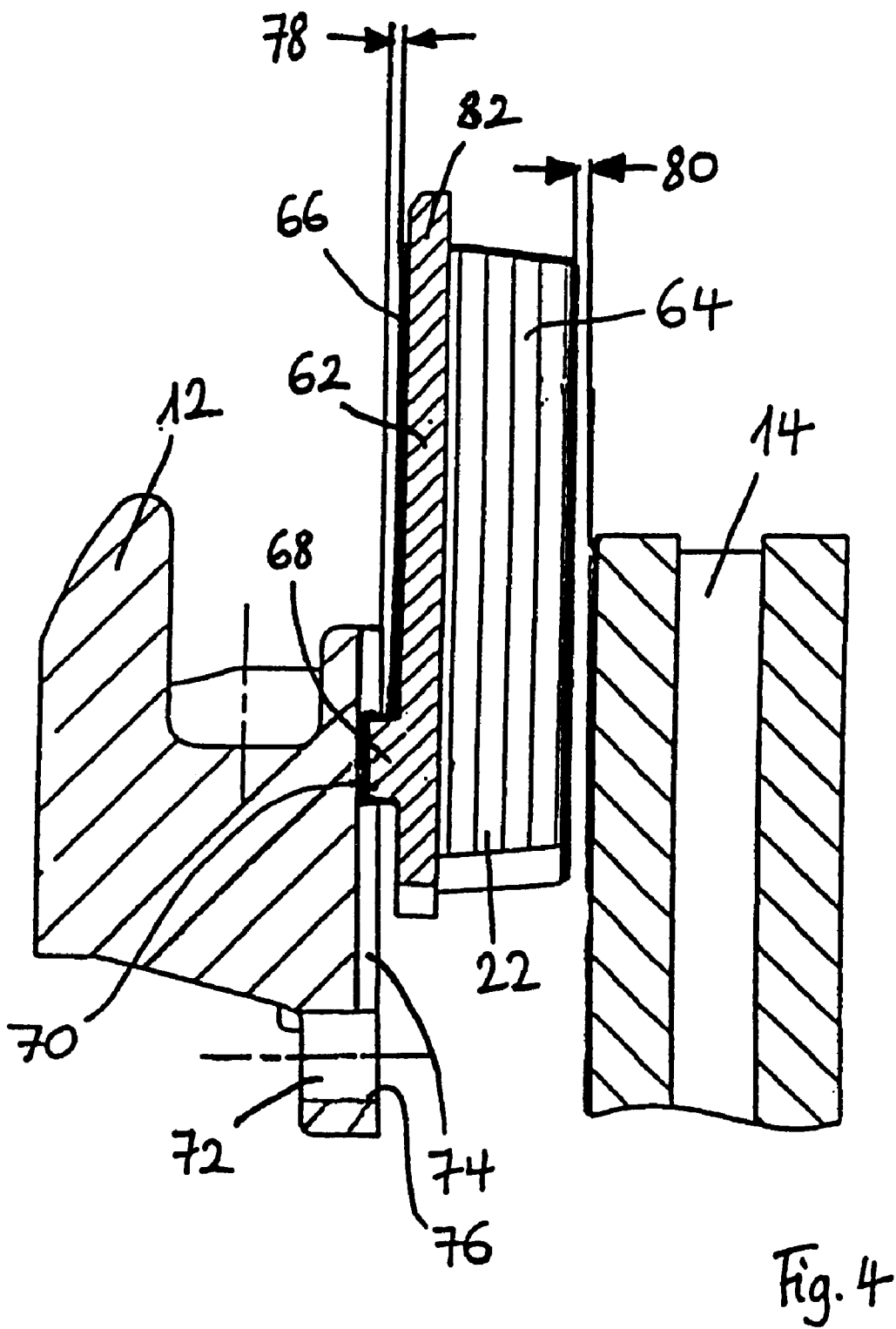
FIG. 4 a partial section through the brake similar to FIG. 3 during introduction of the brake shoe into the brake.

There now follows a description of the invention with reference to FIG. 3, which shows the section A—A through the disk brake with fully assembled brake shoes 20 and 22, and FIG. 4, which shows a detail corresponding to said section, wherein the outer brake shoe 22 is in the process of being installed.

As FIG. 3 reveals, the brake shoes 20 comprise a brake-shoe back plate 58, onto which is applied a friction lining 60 which, during braking, presses against the brake disk 14. The brake shoe 22 similarly comprises a brake-shoe back plate 62 with a friction lining 64. The brake shoe 22 at the rear has a substantially flat surface 66. In the illustrated embodiment, a noise-damping foil (black) is affixed to the brake-shoe back plate 62 and has, provided thereon, an adhesive layer for fastening the brake shoe 22 to the floating frame 12. The surface 66 is therefore formed by the noise-damping foil. Protruding from the surface 66 is a projection 68, the surface 70 of which extends parallel to the flat surface 66 of the brake-shoe back plate 62. The projection 68 engages in the installed state into a bore or recess 72 in the floating frame. The projection 68 here is circular in cross section. It forms a detent device, and the bore 72 forms a detent device complementary thereto.

During installation the brake shoe, as FIG. 4 reveals, is guided in a groove 74 in the floating frame 12, which groove extends from the top edge of the surface, against which the brake shoe is applied, parallel to the centre plane 46 and centre line of the floating frame up to the bore 72. The groove 74 in said case verges into the bore 72 and terminates at the wall 76 of the bore, which wall acts as a stop. The projection 68, when it strikes against the stop 76, may by pressing the brake shoe 22 slightly to the left, be brought into engagement and optionally audible latching with the floating frame 12. The depth of the groove 74 is smaller than the height of the projection, which here is defined as the distance between the end face 70 of the projection and the surface 66. For said reason, when the projection 68 is introduced through the groove 74, a gap 78 remains so that during installation the surface 66 does not come into contact with the floating frame 12. The noise-damping foil situated on the brake-shoe back plate 62 and having the adhesive layer therefore does not adhere to the floating carrier 12 until the projection 68 latches in the bore 72. The depth of penetration of the projection 68 into the bore is in said case determined likewise by the gap 78.

The height of the projection 68 and the depth of the groove 74 are moreover so selected that the distance 80 between the friction lining 64 of the brake shoe 22 and the brake disk 14 during introduction of the brake shoe 22 with the projection 68 along the groove 74 is smaller than the depth of the groove 74. It is therefore impossible for the brake shoe to be introduced between the floating frame 12 and the brake disk 14 without the projection 68 being guided in the groove 74. The brake shoe 22 during installation is grasped at its top end 82, and the large distance between the projection 68, which is guided along the base of the groove 74, and the top end 82.gives rise to a large lever and hence stable guidance of the brake shoe 22 during installation.

Figure 5:
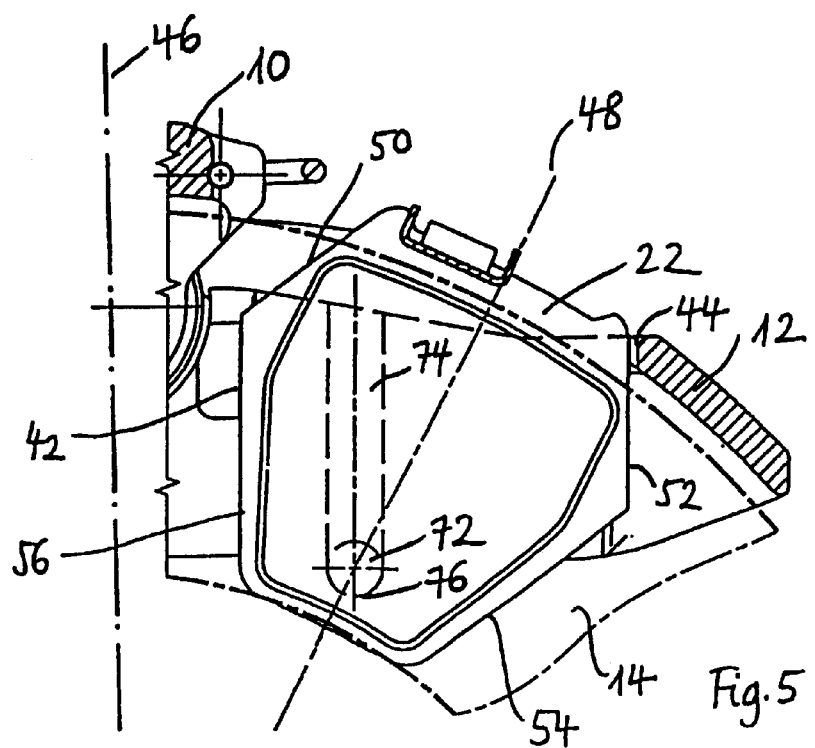
FIG. 5 the section B—B of FIG. 1.

FIG. 5 shows the section B—B in FIG. 1, wherein the brake disk 14 is indicated by a dash-dot line and the course of the groove 74 is illustrated by a dash-dot line. In particular, it is evident that the groove 74 extends parallel to the centre plane 46 and centre line of the floating frame, and that the bore 72 is circular. Besides its function of defining the point of installation of the brake shoe 22 and fastening the latter to the floating frame 12, the projection may additionally transmit some of the peripheral force, which is not absorbed by the supports 42 and 44 (or 38 and 40) and which is also not transmitted by the frictional engagement between the brake-lining back plate 62 (or the noise-damping foil) and the bearing surface of the floating frame 12, to the floating frame 12.

The anchoring of the projection 68 in the bore 72 is effected positively in such a way that, e.g. in the event of fracture of a spring arm 34 of the holding-down spring 32, the brake shoe 22 would not be able to drift out of its installed position.

The groove 74 is a considerable aid when installing the brake shoes under difficult installation conditions.

With the embodiment according to the invention, therefore, both correct installation of the outer brake shoes as well as their reliable fastening to the floating frame 12 is ensured.

The invention has been described here with reference to a sectional-lining disk brake having two outer brake shoes but may also be easily applied to a disk brake with only one outer brake shoe.

What is claimed is:

1. A disk brake comprising:
   a brake anchor plate which is fastenable to a vehicle,
   a floating frame which engages over a brake disk of the brake and is guided on the brake anchor plate,
   at least one brake shoe which is supported against the floating frame at the side of the brake disk directed towards the outside of the vehicle,
   at least one further brake shoe which is supported counter to braking forces against the brake anchor plate at the side of the brake disk directed towards the inside of the vehicle, and
   at least one operating piston which is disposed on the floating frame,
   wherein the brake shoe, which is disposed at the side directed towards the outside of the vehicle, has a projection at its side remote from the brake disk and the floating frame has a recess complementary thereto,
   characterized in that the recess has a depth which is smaller than the height of the projection, wherein at the end of the recess a further recess is provided for receiving the projection.

2. The disk brake according to claim 1 characterized in that the further recess forms a stop for the projection.

3. The disk brake according to claim 1 characterized in that the distance between the surface of the brake shoe directed towards the outside of the vehicle and the brake disk during guidance of the projection along and in the recess is smaller than the depth of said recess.

4. The disk brake according to claim 1 characterized in that the brake shoe directed towards the outside of the vehicle at its side remote from the brake disk is provided with a noise damping foil.

5. The disk brake according to claim 4 characterized in that the height difference between a surface of the projection and a surface of the noise damping foil remote from the brake disk is greater than the depth of the recess.

6. The disk brake according to claim 1 characterized in that the projection is disposed as far away as possible from the region of the brake shoe directed towards the outside of the vehicle which is grasped during installation thereof.

7. The disk brake according to claim 1 characterized in that two separate brake shoes are disposed on either side of the brake disk, and that at least one pair of operating pistons are provided, which are disposed on the floating frame symmetrically in relation to an axial centre plane of the brake anchor plate.

8. The disk brake according to claim 1 characterized in that the projection is formed on or close to an edge of the brake shoe which, during installation of the brake shoe in the brake, is introduced first into the brake.

9. A disk brake comprising:
   a brake anchor plate which is fastenable to a vehicle,
   a floating frame which engages over a brake disk of the brake and is guided on the brake anchor plate,
   at least one brake shoe which is supported against the floating frame at the side of the brake disk directed towards the outside of the vehicle,
   at least one further brake shoe which is supported counter to braking forces against the brake anchor plate at the side of the brake disk directed towards the inside of the vehicle, and
   at least one operating piston which is disposed on the floating frame,
   wherein the brake shoe, which is disposed at the side directed towards the outside of the vehicle, has a recess at its side remote from the brake disk and the floating frame has a projection, which is complementary thereto and engages into the recess,
   characterized in that the recess has a depth which is smaller than the height of the projection, wherein at the end of the recess a further recess is provided for receiving the projection.

10. The disk brake according to claim 9 characterized in that the further recess forms a stop for the projection.

11. The disk brake according to claim 9 characterized in that the distance between the surface of the brake shoe directed towards the outside of the vehicle and the brake disk during guidance of the projection along and in the recess is smaller than the depth of said recess.

12. The disk brake according to claim 9 characterized in that the brake shoe directed towards the outside of the vehicle at its side remote from the brake disk is provided with a noise damping foil.

13. The disk brake according to claim 12 characterized in that the height difference between a surface of the projection and a surface of the noise damping foil remote from the brake disk is greater than the depth of the recess.

14. The disk brake according to claim 9 characterized in that the projection is disposed as far away as possible from the region of the brake shoe directed towards the outside of the vehicle which is grasped during installation thereof.

15. The disk brake according to claim 9 characterized in that two separate brake shoes are disposed on either side of the brake disk, and that at least one pair of operating pistons are provided, which are disposed on the floating frame symmetrically in relation to an axial centre plane of the brake anchor plate.

16. The disk brake according to claim 9 characterized in that the projection is formed on or close to an edge of the brake shoe which, during installation of the brake shoe in the brake, is introduced first into the brake.

17. A brake shoe of a disk brake, characterized by a recess at its side remote from the brake disk such that a projection on a component of the brake engages into the recess, wherein the recess has a depth, which is smaller than the height of the projection, and wherein at the end of the recess a further recess is provided, which is designed to receive the projection.

18. A brake shoe of a disk brake, characterized by a projection, which is disposed at its side remote from the brake disk and engages into a recess in a component of the brake, wherein the projection has a height which is greater than the depth of the recess.

* * * * *